United States Patent [19]

Rackley

[11] Patent Number: 5,078,266
[45] Date of Patent: Jan. 7, 1992

[54] ROTARY SAW BLADE HOUSING APPARATUS

[76] Inventor: Jimmy W. Rackley, 2217 W. Shady Glen Ave., Phoenix, Ariz. 85023

[21] Appl. No.: 668,225

[22] Filed: Mar. 12, 1991

[51] Int. Cl.⁵ .............................................. B65D 85/00
[52] U.S. Cl. ................................... 206/349; 206/303; 206/815; 220/4.22; 220/324
[58] Field of Search ............... 206/303, 307, 309, 349, 206/815; 220/4.22, 4.23, 4.24, 324

[56] References Cited

U.S. PATENT DOCUMENTS

| | | | |
|---|---|---|---|
| 102,923 | 5/1870 | Disston | 206/349 |
| 961,780 | 6/1910 | Lauzon | 220/324 |
| 2,459,460 | 1/1949 | Segal | 206/349 |
| 3,261,454 | 7/1966 | Elson et al. | 206/349 |
| 3,596,822 | 8/1971 | Holley | 206/303 |
| 4,588,082 | 5/1986 | Ridings | 206/349 |
| 4,784,263 | 11/1988 | Stanley | 206/349 |
| 4,811,998 | 3/1989 | Rankin | 206/303 |
| 4,896,771 | 1/1990 | Edwards | 206/349 |
| 4,921,153 | 5/1990 | Smith | 206/303 |

FOREIGN PATENT DOCUMENTS 0820419  9/1951  Fed. Rep. of Germany ...... 206/349
3027804  2/1982  Fed. Rep. of Germany ...... 206/303

Primary Examiner—Jimmy G. Foster
Attorney, Agent, or Firm—Leon Gilden

[57] ABSTRACT

An apparatus wherein a housing includes a base and lid, with the base and lid including a mirror image cavity in alignment relative to one another when the base and lid are in a first spaced configuration. The base and lid are hingedly mounted relative to one another to permit positioning of a similar plurality of saw blades therebetween within the base and lid cavity. The base and lid cavity include cooperative members to align the blades in the cavity. Each cavity is provided with dimaetrically opposed relief cavities to permit manual access to the saw blades when mounted within the cavity portions of each base and lid. A modification of the invention includes oil impregnated fabric members positioned and secured to each top surface of the saw blade to minimize corrosion and adherence of adjacent saw blades.

6 Claims, 4 Drawing Sheets

PRIOR ART

ROTARY SAW BLADE HOUSING APPARATUS

BACKGROUND OF THE INVENTION

1. Field of the Invention

The field of invention relates to saw blade support structure, and more particularly pertains to a new and improved rotary saw blade housing apparatus wherein the same accommodates saw blades of a secure relationship.

2. Description of the Prior Art

Saw blades by their construction are of a generally dangerous configuration due to their construction, including a circular peripheral of cutting teeth. The cutting teeth are also of a nature that deformation of the teeth during handling minimizes efficiency and effective useful life of such saw blades. Prior art structure for housing saw blades may be found in U.S. Pat. No. 4,611,713 to Byrnes wherein a saw blade storage cover utilizes a pocket to receive a saw blade therewithin.

U.S. Pat. No. 4,588,082 to Ridings is an example of a portable case for circular saw blades utilizing hingedly mounted opposed planar flaps securable together mounting saw blades therebetween.

U.S. Pat. No. 4,921,153 to Smith sets forth a bag structure for mounting a circular therewithin, wherein the bag includes a pocket with fastening members mounted to the uppermost portions of the pocket to form an enclosure for securing at least a single saw blade therewithin.

U.S. Pat. No. 4,784,263 to Stanley sets forth a saw blade carrier wherein a housing mounts a rod therethrough for storing saw blades therebetween. As such, it may be appreciated that there continues to be a need for a new and improved rotary saw blade housing apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of saw blade storage apparatus now present in the prior art, the present invention provides a rotary saw blade housing apparatus wherein the same accommodates in a circumferential and closing manner a plurality of saw blades for storage and transport thereof. As such, the general purpose of the present invention, which will be described subsequently in greater detail, is to provide a new and improved rotary saw blade housing apparatus which has all the advantages of the prior art saw blade storage apparatus and none of the disadvantages.

To attain this, the present invention provides an apparatus wherein a housing includes a base and lid, with the base and lid including a mirror image cavity in alignment relative to one another when the base and lid are in a first spaced configuration. The base and lid are hingedly mounted relative to one another to permit positioning of a similar plurality of saw blades therebetween within the base and lid cavity. The base and lid cavity include cooperative members to align the blades in the cavity. Each cavity is provided with diametrically opposed relief cavities to permit manual access to the saw blades when mounted within the cavity portions of each base and lid. A modification of the invention includes oil impregnated fabric members positioned and secured to each top surface of the saw blade to minimize corrosion and adherence of adjacent saw blades.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rotary saw blade housing apparatus which has all the advantages of the prior art saw blade storage apparatus and none of the disadvantages.

It is another object of the present invention to provide a new and improved rotary saw blade housing apparatus which may be easily and efficiently manufactured and marketed.

It is a further object of the present invention to provide a new and improved rotary saw blade housing apparatus which is of a durable and reliable construction.

An even further object of the present invention is to provide a new and improved rotary saw blade housing apparatus which is susceptible of a low cost of manufacture with regard to both materials and labor, and which accordingly is then susceptible of low prices of sale to the consuming public, thereby making such rotary saw blade housing apparatus economically available to the buying public.

Still yet another object of the present invention is to provide a new and improved rotary saw blade housing apparatus which provides in the apparatuses and methods of the prior art some of the advantages thereof, while simultaneously overcoming some of the disadvantages normally associated therewith.

Still another object of the present invention is to provide a new and improved rotary saw blade housing apparatus wherein the same provides an enclosure for securing a plurality of saw blades therewithin to maintain the saw blades in a secure stacked array, and further providing corrosion inhibiting and saw blade separator members within the housing and between the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
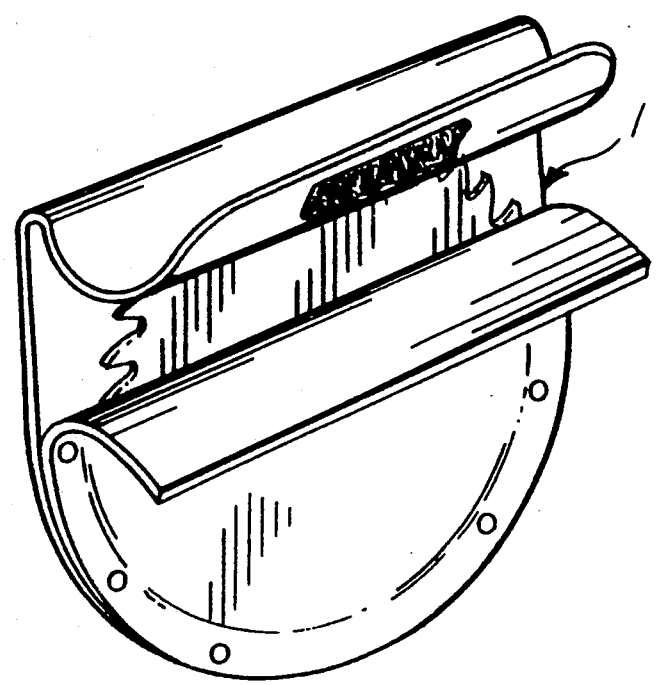
FIG. 1 is an isometric illustration of a prior art saw blade storage apparatus.

With reference now to the drawings, and in particular to FIGS. 1 to 8 thereof, a new and improved rotary saw blade housing apparatus embodying the principles and concepts of the present invention and generally designated by the reference numeral 10 will be described.

Figure 2:
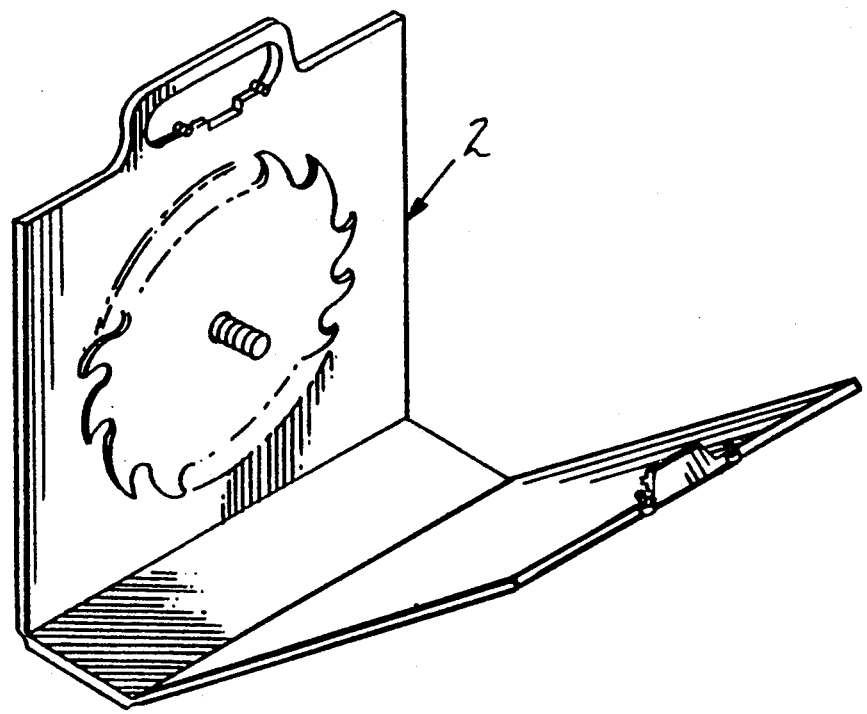
FIG. 2 is an isometric illustration of a further example of a prior art saw blade storage apparatus.

FIG. 1 is an isometric illustration of a prior art rotary saw blade storage organization 1, as set forth in U.S. Pat. No. 4,921,153, setting forth a pocket structure for receiving a saw blade therewithin, utilizing hook and loop fastener structure to secure the saw blade in an enclosed configuration. FIG. 2 illustrates a further prior art saw blade storage organization 2, wherein rigid opposed wall members are utilized to enclose at least a single saw blade within the organization, as set forth in U.S. Pat. No. 4,588,082.

Figure 3:
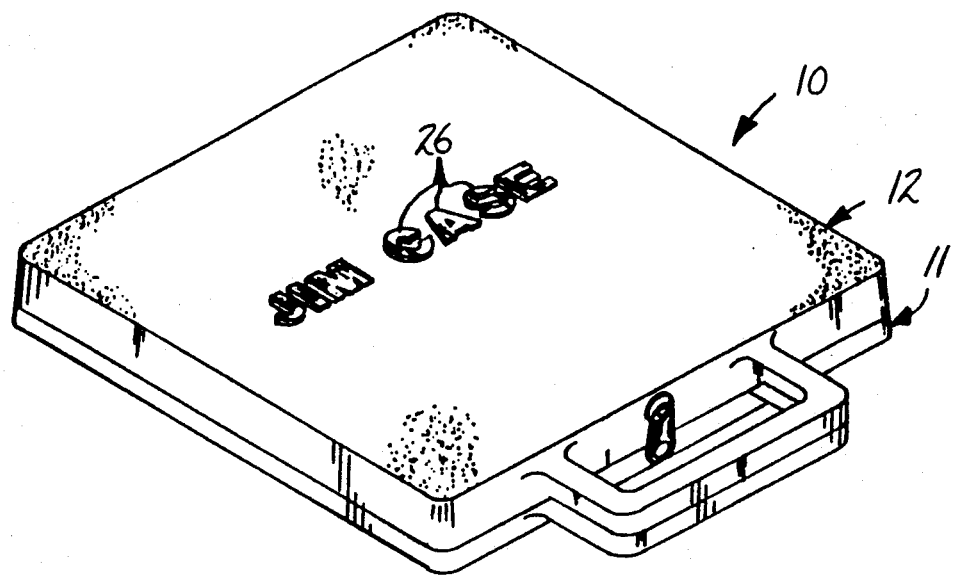
FIG. 3 is an isometric illustration of the housing of the instant invention in a first closed position.
Figure 4:
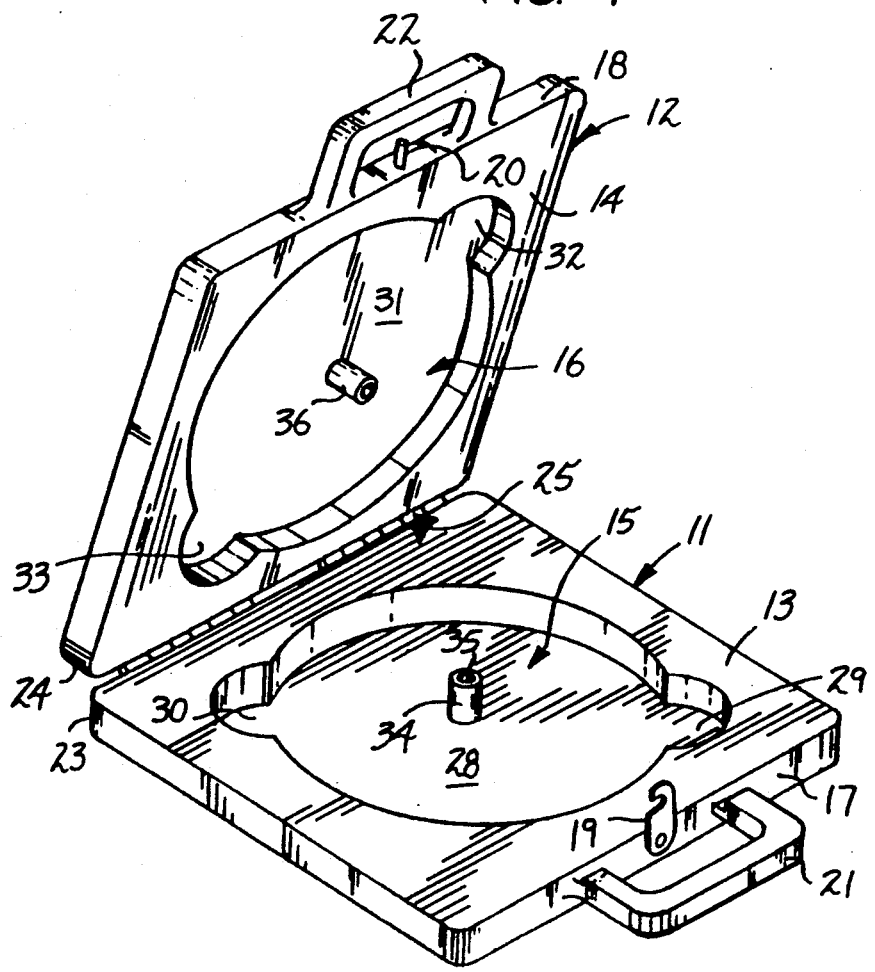
FIG. 4 is an isometric illustration of the housing apparatus of the instant invention in a second opened position.

More specifically, the rotary saw blade housing apparatus 10 of the instant invention essentially comprises a housing structure including a housing base 11 hingedly mounted to a housing lid 12. The housing base 11 includes a housing base interior surface 13 of a predetermined planar configuration cooperative with and of mirror image to a complementary overlying housing lid interior surface 14 that are in contiguous communication in the first position, as illustrated in FIG. 3, and at an angularly separated orientation, as illustrated in FIG. 4. The housing base 11 includes a housing base cavity 15 directed orthogonally into the interior surface 13 cooperative with a complementary and mirror image configuration lid cavity 16 directed orthogonally into the housing lid interior surface 14. The housing base cavity 15 includes a first central cylindrical cavity 28 and diametrically opposed first and second semi-cylindrical relief cavities 29 and 30. The housing lid cavity 16 includes a second central cylindrical cavity 31 substantially equal to the first semi-cylindrical relief cavity 29, and includes third and fourth semi-cylindrical relief cavities 32 and 33 mounted on diametrically opposed portions of the central cylindrical cavity 31 in alignment with the first and second respective semi-cylindrical relief cavities 29 and 30 when the lid is in the first overlying position, as illustrated in FIG. 3. A first tubular boss 34 is orthogonally and coaxially mounted within the first central cylindrical cavity 28 and includes a first central bore 35 defined by a predetermined interior diameter to receive a second tubular boss 36 that is coaxially and orthogonally mounted within the housing lid cavity 16 defined by a predetermined exterior diameter substantially equal to the predetermined interior diameter, wherein the first tubular boss 34 extends upwardly beyond the housing base interior surface 13 to accommodate reception of the second tubular boss 36 therewithin to maintain alignment and securement of the lid and base in the first position.

The housing base 13 includes a base forward wall 17, with a latch plate 19 pivotally mounted thereon medially of the base forward wall 17 formed with a notch to receive a boss rod 20 that is orthogonally mounted within the lid forward wall 18 to secure the lid and base together in an assembled configuration. A first handle 21 is mounted on the base forward wall 17, with a second handle 22 mounted on the lid forward wall 18, with the first and second handles 21 and 22 in contiguous and adjacent alignment relative to one another when the lid and base are in the first position. The base includes a base rear wall 23, and the lid includes a lid rear wall 24, with an elongate hinge 25 hingedly mounting the lid and base together at the base and lid rear walls 23 and 24 respectively. The hinge 25 includes a hinge rod 27 directed through the hinge to mount the lid and base together.

Further it should be noted that the lid 12 includes a plurality of raised curvilinear boss members 26 mounted thereon for enhanced frictional engagement of the top surface of the lid to permit ease of manual grasping of the housing when not employing the handles 21 and 22.

Figure 5:
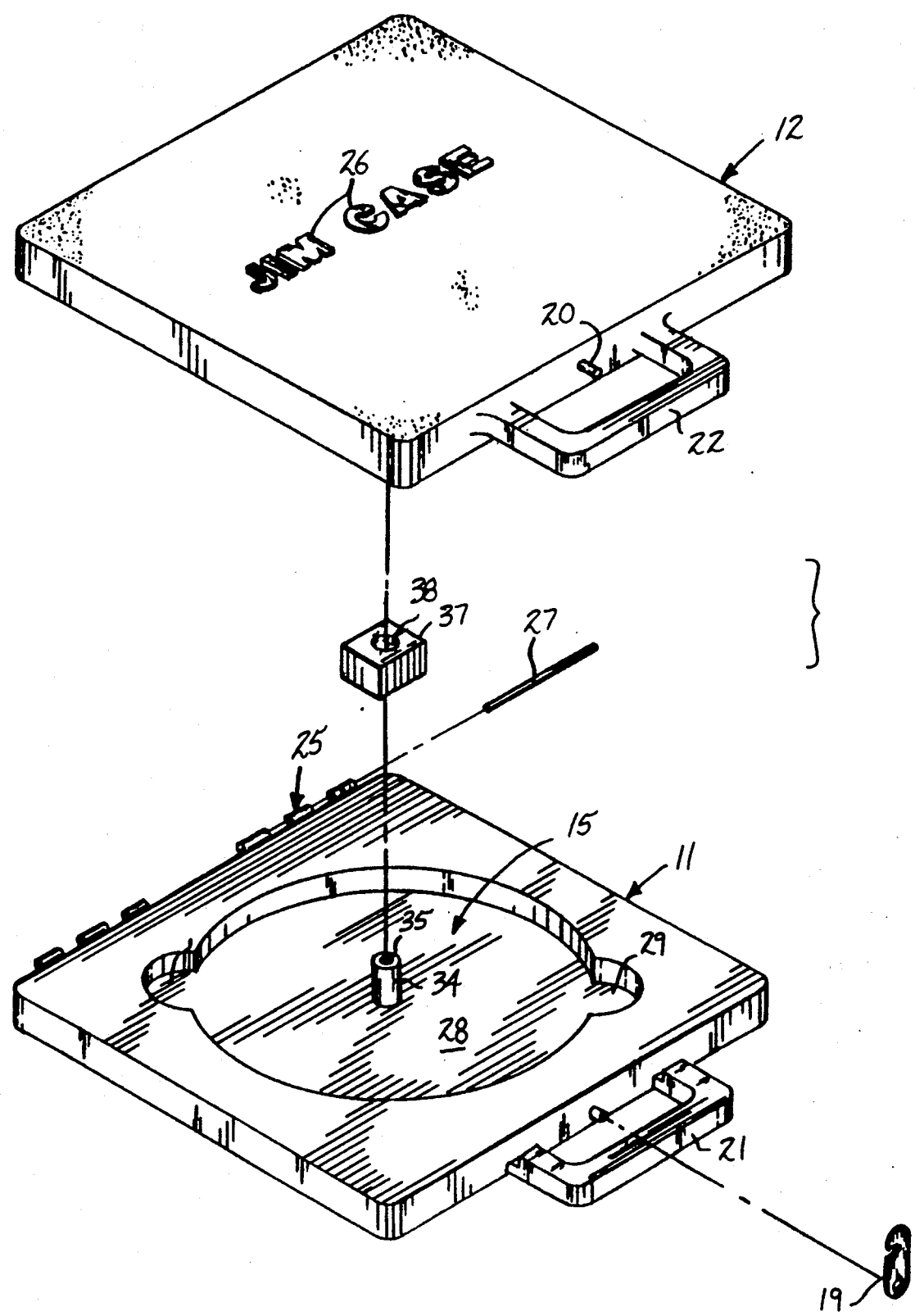
FIG. 5 is an isometric, exploded illustration of the instant invention utilizing an adaptor block member.

Reference to FIG. 5 illustrates that an adaptor block member 37 is utilized, defined by a generally square parallelepiped configuration, including a central bore 38 to complementarily receive the first tubular boss 34 therethrough to accommodate circular saw blades whose central opening utilizes a diamond type opening for alignment within an associated circular saw (not shown).

Figure 6:
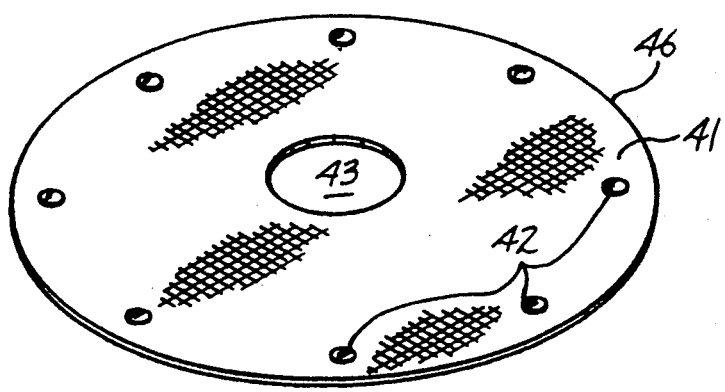
FIG. 6 is an isometric illustration of a cover member utilized by the instant invention.
Figure 7:
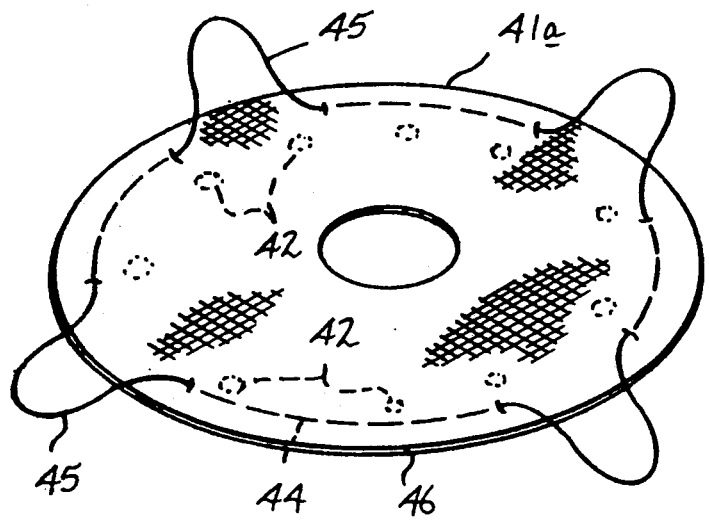
FIG. 7 is an isometric illustration of a modified cover member utilized by the instant invention.
Figure 8:
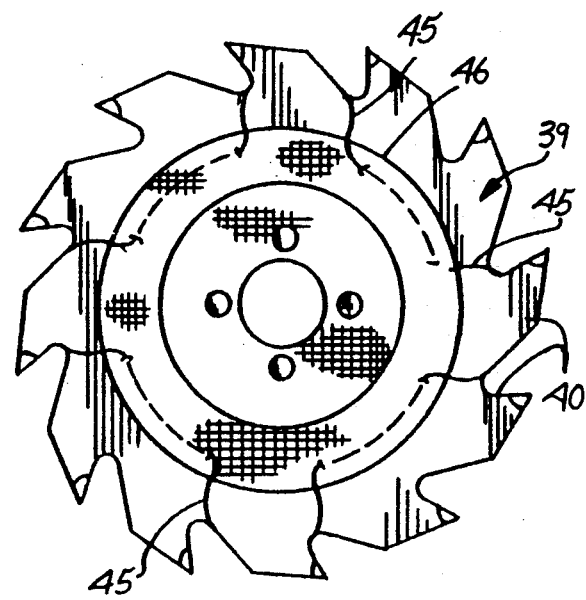
FIG. 8 is an isometric illustration of the modified cover member mounted to an associated saw blade for positioning within the housing structure.

FIG. 6 illustrates the use of a circular saw blade cover 41 formed of an oil impregnated fabric for mounting to a circular blade 39 whose peripheral edge includes a series of equally spaced blade teeth 40. The cover 41 includes a series of equally spaced magnetic members 42 mounted angularly about the cover adjacent the outer cover periphery 46. FIG. 7 illustates a modified cover 41a, including the magnetic members 42, as well as an elastomeric band 44 directed through the cover, with opposed elastomeric band loops 45 directed exteriorly of the periphery 46 in diametrically opposed pairs that are spaced ninety degrees apart relative to one another for securement about diametrically opposed blade teeth 40 of the associated circular saw 39 in cooperation with the magnetic members 42 to maintain alignment of the cover relative to a side wall of a circular saw blade 39. In this manner, an array of circular saw blades may be mounted, each separated by at least one oil impregnated fabric cover to minimize corrosion and abrasion of circular saw blades relative to one another, as such abrasion may effect damage to adjacent teeth members which frequently use such inserts such as carbide and the like which may be damaged by their engagement relative to one another. Further, the cover includes a central cover bore 43 to permit accommodation of the first and second tubular bosses 34 and 36 therethrough.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotary saw blade housing apparatus comprising, in combination, a housing, the housing including a housing base and a housing lid, the housing base including a housing base forward wall and a housing base rear wall, and the housing lid including a housing lid rear wall and a housing lid forward wall, the housing base forward wall includes a latch plate pivotally mounted medially thereof, wherein the housing lid forward wall includes a boss rod fixedly and orthogonally mounted medially thereof cooperative with the latch plate to secure the housing base in a contiguous overlying relationship relative to the housing lid in a first position, and the housing lid rear wall and the housing base rear wall include at least one hinge member to pivotally mount the housing base with the housing lid, and the housing base including planar base interior surface, with the housing lid including a housing lid interior surface, the housing base interior surface and the housing lid interior surface in a contiguous confronting relationship in the first position, and the housing base interior surface including a housing base cavity, and the housing lid including a housing lid cavity, and the housing base cavity and housing lid cavity of a mirror image configuration to receive a saw blade therewithin.

2. An apparatus as set forth in claim 1 wherein the housing base cavity includes first central cylindrical cavity and the first central cylindrical cavity including a respective first and second semi-cylindrical relief cavity formed diametrically opposed extending rearwardly of the first central cylindrical cavity, and the housing lid cavity including a second central cylindrical cavity, with the second central cylindrical cavity including a respective third and fourth semi-cylindrical relief cavity, with the third and fourth semi-cylindrical relief cavity in confronting relationship with a respective first and second semi-cylindrical relief cavity to accommodate manual access to the respective first and second central cylindrical cavity.

3. An apparatus as set forth in claim 2 wherein the first central cylindrical cavity includes a first tubular boss fixedly and orthogonally mounted coaxially of the first central cylindrical cavity, and a second tubular boss mounted fixedly and orthogonally relative to the second cylindrical cavity, with the first tubular boss extending upwardly beyond the housing base interior surface, and the first tubular boss including a central bore, the central bore complementarily receiving the second tubular boss therewithin to secure at least one rotary saw blade within the first and second central cylindrical cavity.

4. An apparatus as set forth in claim 3 including an adaptor block member, the adaptor block member including a central bore, the central bore complementarily receiving the first tubular boss therethrough, with the adaptor block member arranged for reception within a further rotary saw blade formed with a generally diamond shaped central opening directed therethrough.

5. An apparatus as set forth in claim 4 including at least one central oil impregnated fabric cover adapted for securement to the rotary saw blade, the fabric cover including an annular outer periphery, and further including a plurality of magnetic members mounted within the magnetic cover for adherence of the magnetic members to the rotary saw blade, with the magnetic members equally spaced and secured to the fabric cover adjacent the periphery, and the fabric cover including a central cover bore.

6. An apparatus as set forth in claim 5 wherein the fabric cover further includes a continuous elastomeric band mounted within the cover, with the elastomeric band including plural pairs of diametrically opposed elastomeric band loops extending exteriorly of the periphery for securement to the rotary saw blade in association with the magnetic members.

* * * * *